United States Patent [19]
Peters

[11] 4,210,525

[45] Jul. 1, 1980

[54] HYDRODENITROGENATION OF DEMETALLIZED RESIDUAL OIL

[75] Inventor: Alan W. Peters, Moorestown, N.J.

[73] Assignee: Mobil Oil Corporation, New York, N.Y.

[21] Appl. No.: 32,827

[22] Filed: Apr. 24, 1979

[51] Int. Cl.² .................................................. C10G 23/02
[52] U.S. Cl. ............................... 208/212; 208/251 H; 208/253; 208/254 H
[58] Field of Search ............... 208/254 H, 211, 251 R, 208/251 H, 212

[56] References Cited

U.S. PATENT DOCUMENTS

| | | | |
|---|---|---|---|
| 3,530,066 | 9/1970 | Kuwata | 208/254 H |
| 3,696,027 | 10/1972 | Bridge | 208/251 H |
| 3,876,523 | 4/1975 | Rosinski et al. | 208/251 H |
| 3,900,390 | 8/1975 | Adams et al. | 208/254 H |
| 4,008,149 | 2/1977 | Itoh et al. | 208/251 H |
| 4,016,067 | 4/1977 | Fischer et al. | 208/251 H |

*Primary Examiner*—George Crasanakis
*Attorney, Agent, or Firm*—Charles A. Huggett; Vincent J. Frilette

[57] ABSTRACT

Demetallized oils such as deasphalted or catalytically demetallized residua are upgraded as catalytic cracking feedstock by contact with a denitrogenation catalyst having at least 80 percent of its pore volume in pores less than 50 Angstroms in diameter.

5 Claims, 2 Drawing Figures

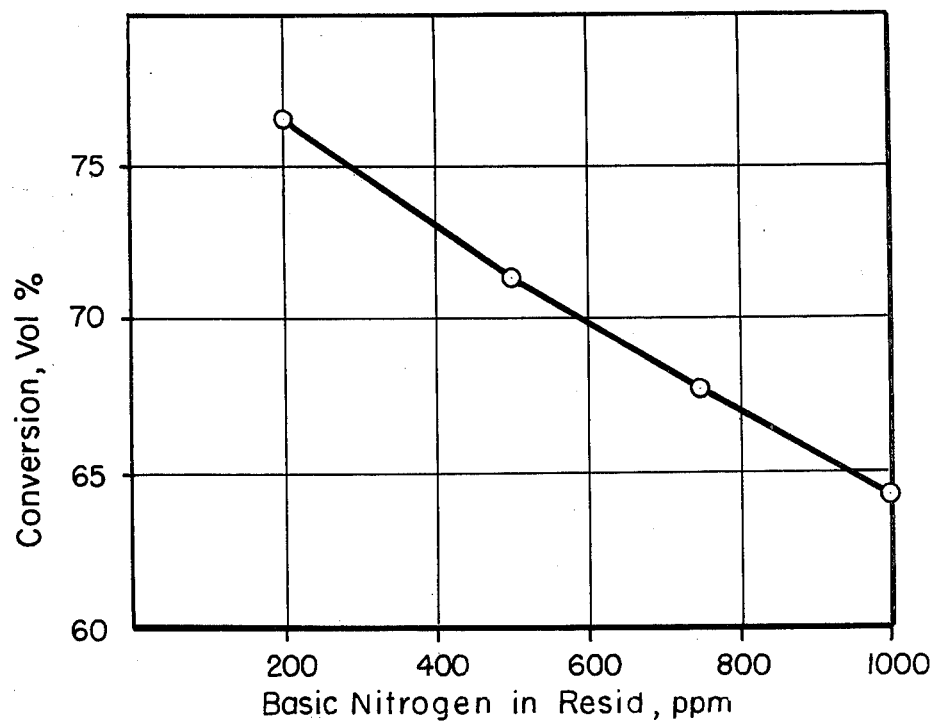
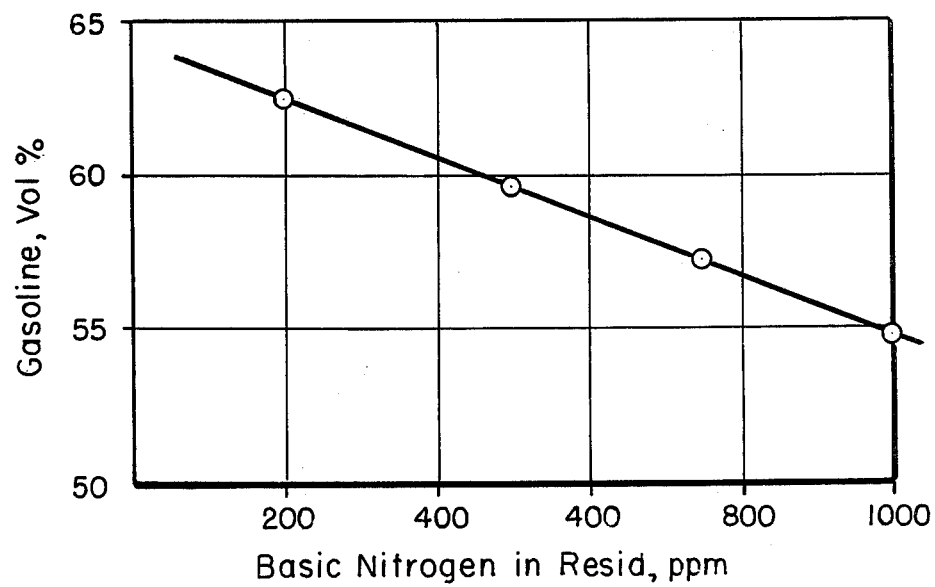

HYDRODENITROGENATION OF DEMETALLIZED RESIDUAL OIL

BACKGROUND OF THE INVENTION

1. Field of the Invention

This invention is concerned with the production of high quality catalytic cracking feedstock from residual oil. In particular, it is concerned with a process in which an atmospheric tower or a vacuum tower residual oil is demetallized in a first stage treatment, and is subsequently hydroprocessed in the presence of hydrogen with a specific catalyst characterized by a particular pore size distribution to reduce its nitrogen content. The first stage treatment may be a solvent treatment such as is practiced in deasphalting, or it may be catalytic.

2. Description of the Prior Art

The art of catalytic cracking of hydrocarbons to produce gasoline and other light distillates including fuel oil from heavier fractions of petroleum has been highly developed. This art is important technologically and economically since it increases the supplies of needed light liquid fuels at the expense of heavier fractions. These heavy fractions appear to be in less demand or are replaceable by other sources of energy such as coal. The cracking process, however, has some limitations. In its best form, it requires a distillate feed which is substantially free of metals. The reason for this is that the modern highly selective catalysts used in the process are poisoned by metals introduced with the feed. These metals accumulate on the cracking catalyst and cause the production of inordinate amounts of coke and gas by-products that are generally regarded as economically undesirable. In addition, if the generation of inordinate amounts of gas overloads the gas plant associated with the catalytic cracker, the refiner may be compelled to reduce the amount of feed passed through the cracking unit. Thus, the economic penalty for excessive metals in the feed is compounded.

For the foregoing reasons, it is not common practice to put residual oils into a catalytic cracker.

Residual petroleum oil fractions produced by distillation of crude petroleum are characterized by relatively high metals, sulfur and nitrogen content. This comes about because practically all of the metals present in the original crude remain in the residual oil fraction and a disproportionate amount of sulfur and nitrogen from the original crude also remains in that fraction. Principal metal contaminants are nickel and vanadium and small amounts of iron and copper are also sometimes present. Additionally, trace amounts of zinc and sodium are found in some feedstocks.

The amount of metals present in a given hydrocarbon stream is often expressed as a chargestock "metals factor." This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker. The particular circumstances at a refinery location, including availability of chargestocks and equipment design and capacity, will dictate the maximum metals level that is tolerable, and in general this will correspond to a metals factor less than 50.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions with a metals factor of less than 50 suitable for cracking chargestocks.

There are several ways in which the foregoing metal and sulfur contents may be reduced in a residual oil. For example, the residuum may be destructively distilled to produce distillates of low metals content leaving behind a solid coke fraction that contains most of the metals. Coking is typically carried out in a reactor or drum operated at about 800°–1100° F. temperature and a pressure of 1–10 atmospheres.

Except for the residua from a limited number of paraffinic type crudes, most crudes contain considerable fractions of asphalt. The residuum may be deasphalted by employing propane, for example, as a deasphalting solvent. In this process, propane and residuum are typically introduced at different points in the side of an extraction tower. The propane, being lighter, is introduced below the oil and flows upward countercurrently to the asphalt which is rejected. Oil and propane are removed from the top of the tower and asphalt from the bottom. The two streams are transferred to recovery systems where the propane is removed and returned to the extraction system. As is known to those skilled in the art the amount of solvent used and the selection of other process variables affect the efficiency of asphalt removal. The recovered deasphalted residuum is characterized by considerably lower metal and sulfur content than the crude residuum.

In addition to the foregoing processes, it has been proposed to catalytically reduce the metals and sulfur content of residual oils. There have been a number of variations proposed for catalytic demetallation, many of which depend on selection of a catalyst having a particular pore size distribution. In general, however, the processes utilize a catalyst comprising a Group VIB and a Group VIII hydrogenation metal on an alumina support. To effect demetallation, the residual oil and hydrogen are passed at elevated temperatures of about 600°–900° F., at a space velocity of 0.1 to 10 LHSV (i.e., 0.1 to 10 volumes of oil per volume of catalyst per hour), and at a hydrogen pressure of about 500–3000 psig. Patents which describe such catalytic demetallation processes include: U.S. Pat. No. 4,054,508 issued Oct. 18, 1977; U.S. Pat. No. 3,730,879 issued May 1, 1973; U.S. Pat. No. 3,830,720 issued Aug. 20, 1974; and U.S. Pat. No. 3,696,027 issued Oct. 3, 1972. Applicant makes no representation that this is an exhaustive list, but it does serve to illustrate the state of the art.

The demetallized residual oil produced by any of the above processes usually still contains a substantial amount of total and basic nitrogen. These basic nitrogen compounds are deleterious in catalytic cracking because they act as catalyst poisons, reducing the activity and selectivity of the catalyst.

It is an object of this invention to provide a process for preparing high quality catalytic cracking feedstock from a residual oil. It is a further object of this invention to provide a catalytic process for treating a demetallized residual oil to reduce its nitrogen and sulfur content, thereby improving its quality as a catalytic cracking feedstock. It is a further object of this invention to provide a catalytic system for demetallizing, desulfurizing and denitrogenating a residual oil by contact with two different catalysts in series. These and other objects will become apparent on reading this entire specification including the claims hereof.

BRIEF DESCRIPTION OF THE DRAWING

The drawing illustrates the effect of the basic nitrogen content of the residual oil feed to a catalytic cracker on the volume % conversion and gasoline yield as found in a simulation of a commercial fluid catalytic cracking operation.

DESCRIPTION OF THE INVENTION

It has now been found that a demetallized residual oil having a metals factor less than 50 is improved in quality as a feedstock for catalytic cracking if, prior to cracking, it is contacted in the presence of hydrogen with a denitrogenation catalyst comprising the oxides or sulfides of a Group VIB metal (chromium, molybdenum and tungsten) and an iron group metal (iron, cobalt and nickel) on an acidic, porous refractory oxide, said catalyst having at least 80% of its pore volume in pores up to 50 Angstroms diameter. Under reaction conditions more fully specified hereinbelow, the nitrogen content and content of polynuclear aromatic hydrocarbons of the demetallized residual oil are reduced by the method of this invention to an extent effective to substantially increase the conversion and gasoline yield on subsequent cracking. This result is surprising since very small pore size catalysts are not usually considered for processing residual oils.

The acidic, porous refractory oxide support for the denitrogenation catalyst to be used in treating demetallized residuum comprises silica and a second oxide such as alumina, zirconia or magnesia. The preferred support consists of silica-alumina with an alumina content of about 5 to 40 weight percent. The support may be prepared in any manner known to those skilled in the art of catalyst preparation such that after impregnation with the hydrogenation component the desired pore size distribution is achieved. The hydrogenation component, which will constitute from about 2 to 35% by weight of the finished catalyst, consists of the oxides or sulfides of a Group VIB and an iron group metal, as hereinabove defined. The hydrogenation component may be composited with the support in any known manner, such as by impregnation of the support with salts of the required metals followed by drying and calcining. The preferred hydrogenation component for purposes of this invention consists of nickel/tungsten, with about 1 to about 7 wt.% nickel and about 2 to about 22 wt.% tungsten computed as metals based on weight of catalyst. The catalyst composition contains less than about 2 wt.% sodium as oxide. A particularly useful denitrogenation catalyst for purpose of this invention has a pore volume of 0.25 to 0.45 cc/g, a real density of 3.4 to 4.0 grams per cubic centimeter, and a particle density of 1.4 to 1.8 grams per cubic centimeter. A particularly preferred catalyst has a pore size distribution, as determined by mercury porosimeter substantially as follows:

| Pore Size Distribution | |
|---|---|
| Pore Diameter | % of Pore Volume |
| 0–30 Angstroms | 38 |
| 30–50 | 57 |
| 50–80 | 3 |
| 80–100 | 0 |
| 100–150 | 0 |
| 150–200 | 0 |
| 200–300 | 0 |
| 300+ | 2 |
| | 100 |

Thus, the particularly preferred catalyst is characterized by having less than 10% of its pore volume in pores larger than 65 Angstroms in diameter.

The demetallized oil to be treated in the process of this invention may be derived from various petroleum fractions, including a whole or topped crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical demetallized residues to which the present invention is applicable will normally be substantially composed of residual hydrocarbons boiling above 650° F. Thus, the stream to be demetallized can be one having an initial or 5% boiling point somewhat below 650° F., provided that a substantial proportion, for example, about 50% by volume, of its hydrocarbon components boil above 650° F. Demetallization may be effected by any known process, including solvent deasphalting, coking and catalytic treatment. In any case the demetallized oil treated in the process of this invention has a metals factor, as hereinabove defined, of less than 50, and preferably less than about 25.

The demetallized oil is upgraded by the process of this invention by contacting it with the hereinabove described denitrogenation catalyst. Contacting is preferably conducted in a trickle bed operation. Typical process conditions include contacting the feed with the denitrogenation catalyst under a hydrogen pressure of about 500 to 3000 psig, of 600° to 850° F. temperature and 0.1 to 10 LHSV (i.e., 0.1 to 20 volumes of feed per volume of catalyst per hour). In any case, the combination of process conditions are selected from within these prescribed limits so as to substantially reduce the basic nitrogen content of the feed, i.e., reduce the basic nitrogen content by an amount effective to increase by at least 1 vol.% the catalytic conversion of said feed on subsequent catalytic cracking. It is to be understood, of course, that this increased conversion is to be determined without change of cracking conditions.

Although the catalytic cracking feedstock produced by the process of this invention may be derived from residuum demetallized by any process, it is preferred to catalytically demetallize the residuum. By this means two process steps which are similar are combined. For example, a residual oil and hydrogen are contacted first with a demetallation catalyst as described in U.S. Pat. No. 3,876,523 issued Apr. 8, 1975, and the demetallized effluent and hydrogen are contacted in a subsequent step with denitrogenation catalyst described in this invention to produce the upgraded feedstock. The demetallation catalyst in the first step preferably has at least about 60% of its pore volume contributed by pores having diameters in the range of 100 to 200 Angstroms, and a surface area up to about 110 m²g. Thus, the demetallation catalyst has a very much larger pore size than the denitrogenation catalyst. The two contacting steps may be operated under substantially the same conditions of temperature and pressure, or modifications thereof consistent with efficient integration of the steps. The entire contents of U.S. Pat. No. 3,876,523 are herein incorporated by reference.

A particularly preferred embodiment of this invention is the catalytic demetallation of a residual fraction according to U.S. Pat. No. 4,016,067 issued Apr. 5, 1977, followed by treatment of the demetallized oil with a denitrogenation catalyst according to this invention. The entire contents of U.S. Pat. No. 4,016,067 are herein incorporated by reference. The invention described by that patent is a process for demetallizing and desulfurizing residual oil fractions by contact in the presence of hydrogen with a dual catalyst system. The preferred first catalyst of the dual catalyst system is selected from the class of catalysts comprisng a hydrogenating component (cobalt and molybdenum in a preferred embodiment) composited with an alumina support having a demonstrable content of delta and/or theta alumina. The preferred composite catalyst also has at least 60% of its pore volume in pores having a diameter of about 100 Angstroms to 200 Angstroms, at least about 5% of the pore volume in pores greater than 500 Angstroms in diameter, and has a surface area of up to about 110 m²g. The first catalyst also has high-temperature phase delta and/or theta alumina present in sufficient quantity for it to be detectable by X-ray diffraction, i.e., it has a demonstrable content of delta and/or theta phase alumina. The second catalyst of the dual catalyst system is selected from the class of catalyst comprising a hydrogenation component (cobalt and molybdenum in a preferred embodiment) composited with a refractory base (alumina in a preferred embodiment), said composite catalyst having at least 50%, and preferably at least 60% of its pore volume contributed by pores that have a diameter of 300 to 100 Angstroms, and a surface area of at least 150 square meters per gram, and preferably a surface area of at least 175 square meters per gram. The hydrogenating component of the first and second catalysts can be any material or combination thereof that is effective to hydrogenate and desulfurize the chargestock under the reaction conditions utilized. For example, the hydrogenating component is selected from at least one member of the group consisting of Group VIB and the iron group metals in a form, such as metal oxides or sulfides, capable of promoting hydrogenation reactions. Especially effective catalysts for the purposes of this invention are those comprising molybdenum and at least one member of the iron group metals. Preferred catalysts are those containing cobalt and molybdenum, but other combinations of iron group metals and molybdenum may be used, such as iron, or zinc, or nickel and molybdenum, as well as combinations of nickel and molybdenum, cobalt and molybdenum, nickel and tungsten or other Group VIB or Group VIII metals of the Periodic Table taken singly or in combination. Particularly preferred compositions for the first and second catalysts to be used in the process of this invention are those that contain on a weight basis from about 2% to about 6% cobalt or nickel and from about 10% to about 16% molybdenum, the remainder consisting of alumina. These metals may be composited with the alumina by any of the known methods. The second catalyst may be commercial hydrodesulfurization catalyst such as Catalyst HDS-1441 manufactured by American Cyanamid Corporation. Commercially available alumina supports may be impregnated with cobalt and molybdenum salts followed by calcination. As commonly prepared on a commercial scale, the size of the pores of such alumina supports is largely concentrated at about 50 Angstroms diameter, and the alumina is of the gamma variety.

While various particulate forms of the first and second catalysts may be used in the prior art dual bed system, it is preferred to use extrudate of about 1/20 to 1/40 inch diameter. The two catalysts may be disposed in the same vessel or in separate vessels, with the second catalyst always in a downstream position with respect to the first catalyst. The first catalyst preferably should be present in from about 40 to 80 percent of the total dual catalyst volume, the second catalyst occupying the corresponding remainder of from about 60 to 20%. The higher proportions of first catalyst are preferred when the metal contamination is relatively high compared with the sulfur contamination and vice versa. While it is to be understood that other catalyst configurations and modes of operation may be used in the practice of this invention it is particularly preferred to operate the contacting of the feed with the dual bed system in trickle bed fashion.

The contacting conditions for preparing demetallized residual oil with the above-described dual bed system include a hydrogen pressure of about 500 to 3000 psig, of 600° to 850° F. temperature, and 0.1 to 5 LHSV (i.e., 0.1 to 5 volumes of chargestock per volume of catalyst per hour) based on the total complement of catalyst in the dual bed system.

The hydrogen gas which is used during the hydrodemetalation-hydrodesulfurization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

In the foregoing description of the preferred prior-art method for preparing demetallized oil, it is to be understood that the combination of process conditions are chosen so as to result in a demetallized oil having a metals factor described hereinabove of less than 50, and preferably less than about 25.

In the particularly preferred embodiment of this invention, the demetallized oil prepared by the above-described dual bed process is contacted in the presence of hydrogen with the above-described denitrogenation catalyst under conversion conditions effective to reduce its basic nitrogen content by at least 100 ppm, i.e., by an amount effective to its conversion in catalytic cracking, by at least 1 vol.%, thereby upgrading the quality of the oil for catalytic cracking. The product of the demetallation step may be casacaded to the denitrogenation step, thereby avoiding an intermediate separation of hydrogen under pressure and the necessity of maintaining an inventory of demetallized oil feed for the denitrogenation step.

The extent of denitrogenation achievable by the process of this invention is of course variable, with more severe reaction conditions removing greater amounts. In any case, as hereinabove indicated, at least an amount of basic nitrogen effective to substantially increase the vol.% conversion or vol.% of gasoline formed on catalytic cracking is removed. The decision as to how much more a refiner should remove will depend on the feed and the extent of the advantage gained offset by the costs. Since the denitrogenation catalyst hereinabove described also is effective in removing some sulfur, it is contemplated to replace a portion or all of the second catalyst in the particularly preferred demetallation step by the denitrogenation catalyst hereinabove described, and such variant is within the scope of this invention. Such a variant should be particularly effective when a more drastic reduction of nitrogen content at the expense of some sulfur removal is indicated.

The examples which follow are illustrative of, but are not to be construed as limiting, this invention, the scope of which is defined in the specification and by the claims. All parts are by weight unless otherwise specified.

EXAMPLES

Example 1

An Arab Light Vacuum Resid was demetallized substantially by the process described in U.S. Pat. No. 4,016,067 to yield a demetallized oil having a metals factor substantially less than 50. The demetallized oil had the properties shown in Table I.

TABLE I

| | |
|---|---|
| Wt % Sulfur | 1.66 |
| Wt % Nitrogen | 0.23 |
| Basic N, ppm | 700 |
| Wt % Paraffins | 11.0 |
| Wt % Naphthenes | 19.0 |
| Wt % Mono + Di Aromatics | 50.7 |
| Wt % Tri+ Aromatics | 19.3 |

Example 2

The oil prepared in Example 1 was hydrotreated by contact in the presence of hydrogen with a denitrogenation catalyst comprising 5.2 wt.% nickel and 15 wt.% tungsten, as metal, and silica and alumina. The alumina content was about 33%, and 95% of its pore volume was in pores having a diameter less than 50 Angstroms.

For comparison, another portion of the same feed was hydrotreated under similar conditions but using a conventional cobalt-moly on alumina catalyst. This catalyst contained about 2 wt.% cobalt and 14.4 wt.% molybdenum, as metal, and had 78% of its pore volume in pores having a diameter of 50 to 80 Angstroms.

The conditions for these tests and the results obtained are summarized in Table II.

TABLE II

| Process Conditions | Cobalt-Moly (Prior Art) | | Nickel-Tungsten (This Invention) | |
|---|---|---|---|---|
| Reactor Temp., °F. | 726 | 776 | 725 | 777 |
| LHSV | .46 | .46 | .57 | .53 |
| H$_2$ Circulation | 5846 | 7369 | 3943 | 4512 |
| H$_2$ Consumption | 370 | 705 | 345 | 717 |
| Product Properties | | | | |
| Wt % Sulfur | .65 | .33 | .79 | .47 |
| Wt % Nitrogen | .19 | .14 | .13 | .10 |
| Basic N, ppm | 550 | 360 | 350 | 280 |
| Wt % Paraffins | 13.6 | 16.0 | 13.6 | 15.7 |
| Wt % Naphthenes | 19.8 | 26.2 | 26.5 | 35.3 |
| Wt % Mono + Di Aromatics | 48.6 | 43.6 | 48.6 | 41.2 |
| Wt % Tri+ Aromatics | 18.0 | 14.2 | 11.3 | 8.8 |

What is claimed is:

1. A process for preparing a high quality catalytic feedstock from a residual oil, which process comprises treating said oil to reduce the metals content thereof to a metals factor of less than 50 thereby forming demetallized residual oil, and contacting said demetallized oil in the presence of hydrogen at a temperature of 600° to 850° F., a pressure of 500 to 3000 psig, and a liquid hourly space velocity of 0.1 to 10.0 with a denitrogenation catalyst comprising the oxides or sulfides of a group VIB metal and an iron group metal on an acidic porous refractory oxide, said catalyst having at least 80% of its pore volume in pores up to 50 Angstroms diameter.

2. The process described in claim 1 wherein said acidic porous refractory oxide is silica-alumina.

3. The process described in claim 2 wherein said Group VIB metal is tungsten and said iron group metal is nickel.

4. In a process for catalytically demetalizing and desulfurizing a residual oil, said process consisting essentially of: passing a mixture of hydrogen and said oil at a hydrogen pressure of about 500 to 3000 psig, a temperature of about 600° to 850° F., and a space velocity of 0.1 to 5.0 LHSV, through a trickle bed of first catalyst, said first catalyst comprising the oxides or sulfides of a Group VIB metal and an iron group metal on a support comprising a delta or theta phase alumina, said first catalyst having also at least about 60 percent of its pore volume in pores with diameters of about 100 to 200 Angstroms, at least about 5 percent of its pore volume in pores greater than 500 Angstroms, and a surface area of up to about 110 m$^2$/g; and then passing said mixture of hydrogen and said oil through a bed of second catalyst disposed downstream of said first catalyst, said second catalyst comprising the oxides or sulfides of a Group VIB metal and an iron group metal on an alumina support, said second catalyst having a surface area of at least 150 m$^2$/g and at least 50 percent of its pore volume in pores with diameters of 30 to 100 Angstroms, the improvement whereby upgrading said demetallized and desulfurized oil for catalytic cracking, which comprises contacting under conversion conditions said demetallized and desulfurized oil with hydrogen and with a denitrogenation catalyst comprising the oxides or sulfides of nickel-tungsten hydrogenation metals on an acidic porous refractory oxide, said denitrogenation catalyst having at least 80 percent of its pore volume in pores up to 50 Angstroms in diameter.

5. The process described in claim 4 wherein said acidic porous refractory oxide is silica-alumina.

* * * * *